(12) United States Patent
Mueller et al.

(10) Patent No.: US 12,255,296 B2
(45) Date of Patent: Mar. 18, 2025

(54) DISPERSION OF STORED ENERGY WITHIN A BATTERY SYSTEM AT RISK OF FAILURE

(71) Applicant: National Technology & Engineering Solutions of Sandia, LLC, Albuquerque, NM (US)

(72) Inventors: Jacob Mueller, Albuquerque, NM (US); Yuliya Preger, Albuquerque, NM (US); John C. Hewson, Albuquerque, NM (US); Andrew Kurzawski, Austin, TX (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 0 days.

(21) Appl. No.: 18/511,380

(22) Filed: Nov. 16, 2023

(65) Prior Publication Data
US 2024/0088461 A1 Mar. 14, 2024

Related U.S. Application Data

(62) Division of application No. 17/144,681, filed on Jan. 8, 2021, now Pat. No. 11,855,264.

(51) Int. Cl.
*H01M 10/44* (2006.01)
*H01M 10/42* (2006.01)
(Continued)

(52) U.S. Cl.
CPC ....... *H01M 10/443* (2013.01); *H01M 10/425* (2013.01); *H01M 10/441* (2013.01);
(Continued)

(58) Field of Classification Search
CPC ............. H01M 10/443; H01M 10/446; H01M 10/448; H01M 10/44; H01M 10/425;
(Continued)

(56) References Cited

U.S. PATENT DOCUMENTS

| 5,642,100 A | 6/1997 | Farmer |
| 5,656,915 A | 8/1997 | Eaves |

(Continued)

FOREIGN PATENT DOCUMENTS

JP 2004127758 4/2004

OTHER PUBLICATIONS

Jiang et al., Rapid Prediction Method for Thermal Runaway Propagation in Battery Pack Based on Lumped Thermal Resistance Network and Electric Circuit Analogy, Appl. Energy, Jun. 15, 2020, vol. 268, United Kingdom, 16 pages.

*Primary Examiner* — Raymond Alejandro
(74) *Attorney, Agent, or Firm* — Daniel J. Jenkins

(57) ABSTRACT

A method and system for dispersing stored energy in an energy storage system to delay or arrest propagation of thermal runaway and thermally-induced cascading failures. The system includes a plurality of battery sub-assemblies and DC-DC converters connected to a shared DC bus through which energy may be exchanged. The system may be interfaced to an AC power grid or DC power system through an additional power converter. The method of dispersing stored energy uses this system to charge and discharge sub-assemblies such that the system is less susceptible to propagation of thermal runaway. The method determines, based on awareness of current system state, battery types, and electrical and thermal structure, the sequence of charging and discharging actions to best inhibit thermal runaway while preserving the system's ability to perform subsequent energy redistribution.

9 Claims, 5 Drawing Sheets

(51) Int. Cl.
*H01M 10/48* (2006.01)
*H02J 7/00* (2006.01)

(52) U.S. Cl.
CPC .......... *H01M 10/482* (2013.01); *H02J 7/007* (2013.01); *H01M 2010/4271* (2013.01); *H02J 2207/20* (2020.01)

(58) Field of Classification Search
CPC .. H01M 10/441; H01M 10/482; H01M 10/48; H01M 2010/4271; H02J 7/007; H02J 2207/20
See application file for complete search history.

(56) References Cited

U.S. PATENT DOCUMENTS

| | | | |
|---|---|---|---|
| 6,157,164 A * | 12/2000 | Jaworski | H02J 9/061 307/66 |
| 6,844,703 B2 | 1/2005 | Canter | |
| 7,433,794 B1 | 10/2008 | Berdichevsky et al. | |
| 9,099,870 B2 | 8/2015 | Marten | |
| 9,142,979 B2 | 9/2015 | Tsai | |
| 9,318,910 B2 | 4/2016 | Kim | |
| 9,704,384 B2 | 7/2017 | Bandhauer et al. | |
| 2006/0193095 A1 | 10/2006 | Hunter et al. | |
| 2010/0028758 A1 | 2/2010 | Eaves et al. | |
| 2010/0075221 A1 | 3/2010 | Mehta et al. | |
| 2010/0136391 A1 | 6/2010 | Prilutsky et al. | |
| 2012/0194133 A1 | 8/2012 | Posamentier et al. | |
| 2017/0141369 A1* | 5/2017 | Burke | H01M 10/0565 |
| 2017/0141590 A1 | 5/2017 | Tofigh et al. | |
| 2017/0214103 A1 | 7/2017 | Onnerud et al. | |
| 2017/0244141 A1 | 10/2017 | Weicker | |
| 2018/0008760 A1* | 1/2018 | Zilbershlag | H01M 50/569 |

* cited by examiner

DISPERSION OF STORED ENERGY WITHIN A BATTERY SYSTEM AT RISK OF FAILURE

CROSS-REFERENCE TO RELATED APPLICATION

This is a divisional application of U.S. application Ser. No. 17/144,681, entitled "DISPERSION OF STORED ENERGY WITHIN A BATTERY SYSTEM AT RISK OF FAILURE," filed Jan. 8, 2021, which is incorporated herein by reference.

STATEMENT REGARDING FEDERALLY SPONSORED RESEARCH OR DEVELOPMENT

This invention was developed under Contract No. DE-NA0003525 awarded by the United States Department of Energy/National Nuclear Security Administration. The Government has certain rights in this invention.

BACKGROUND OF THE INVENTION

The application generally relates to battery powered storage systems. The application relates more specifically to systems and methods for dispersion of stored energy within a battery system at risk of failure.

Modern power delivery systems are increasingly dependent on energy storage. Of available storage technologies, electrochemical energy storage is developing the most rapidly in terms of technological maturity, manufacturing capability, and installed capacity in the grid. Many large-scale electrochemical storage installations use some form of Lithium Ion chemistry. Li-Ion batteries' dominance in this area is due to their advantageous electrochemical properties, including low self-discharge, high energy density, and high power density.

A disadvantage of Li-Ion batteries is that they have the potential to fail violently. The most spectacular failures are produced by a condition known as thermal runaway, in which an exothermic reaction is sustained and accelerated by heat release in a positive feedback loop. This process cannot be interrupted without direct intervention and, critically, leads to cascading failures as heat released by the failing cell triggers thermal runaway in adjacent devices. In this way, thermal runaway is said to propagate through the battery system. The ability to propagate to nearby cells is perhaps the most concerning aspect of thermal runaway, particularly with respect to the large storage systems typical of utility applications. In the same way that high winds may turn a modest brush fire into an uncontrollable wildfire, propagation of thermal runaway is the procedural link that allows an otherwise manageable cell failure to develop into an explosive total system failure.

An additional dimension to the problem of thermal runaway is that simple failsafe solutions employed in other electrical energy source equipment are not able to impact chemical processes within a battery. Protective devices such as breakers, fuses, and relays may isolate a failing battery from an external circuit but do nothing to affect internal processes that lead to increased heat release and onset of thermal runaway. In other words, electrically isolating a failing cell does not provide sufficient protection for the system. Moreover, electrically isolating cells of a failing battery system effectively locks all stored energy in the system; this stranded energy is hazardous to personnel responding to the original failure event.

Prior art methods for preventing such thermal runaway have focused on cooling of the at-risk cell. For example, in electric vehicles, a cell indicating early signs of thermal runaway will be saturated with an active cooling agent, or phase change materials surrounding the cell will absorb the excess heat.

What is needed are systems and methods that overcome the limitations and disadvantages of the prior art.

SUMMARY OF THE INVENTION

One embodiment relates to a method for dispersion of stored energy within a battery system. The method includes providing an energy storage system comprising a plurality of battery sub-assemblies connected through DC-DC converters to a shared DC bus; detecting a thermal runaway event associated with one of the battery sub-assemblies; isolating the sub-assembly associated with the thermal runaway event; identifying pathways taken by thermal energy released by the thermal runaway event; determining a likelihood of successfully mitigating propagation of thermally-induced failures proximate to the inactivated sub-assembly based on system structure and present conditions; computing an optimal set of discharge current values to most effectively disperse stored energy from the thermal energy pathway; determining which sub-assemblies of the plurality of sub-assemblies may receive dispersed energy for charging; determining a respective optimal charging current value for each sub-assembly of the plurality of sub-assemblies and generating a command to disperse energy at the optimal charging current value respectively; identifying and applying variable thermal limits to power converters to manage acceptance of converter failure risk according to the severity of the thermal runaway event; determining whether one or more of the sub-assemblies has been sufficiently depleted to mitigate the propagation of thermal runaway; and isolating one or more sub-assemblies which have been sufficiently depleted until no further dispersion of energy is possible in the system.

Another embodiment relates to a system for dispersing stored energy in an energy storage system. The system for dispersing energy includes a plurality of battery sub-assemblies connected through a plurality of respective DC-DC converters to a shared DC bus. Each battery sub-assembly has a DC voltage connected to a respective DC-DC converter. Each DC-DC converter is configured for powering the shared DC bus. A controller is configured to detect a thermal runaway condition occurring in at least one failed battery sub-assembly. In response to detecting the thermal runaway condition, the controller isolates the DC-DC converter connected to the failed battery sub-assembly. The controller then disperses energy from at least one adjacent battery sub-assembly to charge at least one remaining battery sub-assembly or, if an external connection is available, routes energy through this connection to remove it from the system.

Another embodiment relates to a computer program product embodied in a non-transitory computer readable medium for dispersion of stored energy within a battery system. The computer program product includes code which causes one or more processors to perform operations of: detecting a thermal runaway event associated with one of the battery sub-assemblies, isolating the sub-assembly associated with the thermal runaway event, identifying pathways taken by thermal energy released by the thermal runaway event, determining a likelihood of successfully mitigating propagation of thermally-induced failures proximate to the inactivated sub-assembly based on system structure and current conditions, computing an optimal set of discharge current values to most effectively disperse stored energy from the thermal energy pathway, determining which sub-assemblies of the plurality of sub-assemblies may receive dispersed energy for charging, determining a respective optimal charging current value for each sub-assembly of the plurality of sub-assemblies and generating a command to disperse energy at the optimal charging current value respectively, identifying and applying variable thermal limits to power converters to manage acceptance of converter failure risk according to the severity of the thermal runaway event; determining whether one or more of the sub-assemblies has been sufficiently depleted to mitigate the propagation of thermal runaway, and isolating one or more sub-assemblies which have been sufficiently depleted until no further dispersion of energy is possible in the system.

Advantages of the embodiments described herein include a means for delaying or arresting propagation of thermal runaway in large scale battery systems. The rate at which thermal runaway propagates between adjacent cells depends on a variety of internal and external factors and can be affected by electrically redistributing stored energy such that the totality of these factors are less favorable for rapid propagation.

Another advantage is that the proposed method for dispersion of energy creates less reactive zones in the multi-cell system that act as an internal fire wall to prevent cascading failure.

Another advantage is that propagation of thermal runaway may be significantly slowed, and less violent, when cells adjacent to the failed cell have lower states of charge (SoC).

Another advantage is that the amount of heat generated inside a cell during thermal runaway decreases with decreasing SoC. In some cases, when the SoC of adjacent cells is below some threshold value which depends on ambient temperature, cell-to-cell distance, and other system-specific parameters), propagation fails entirely.

The proposed invention exploits the relationship between SoC of adjacent cells and likelihood of cell-to-cell propagation and, consequently, sub-assembly-to-sub-assembly, propagation by actively shuttling energy away from cells in close proximity to the failure event.

Another advantage is a control algorithm to manage responses to cell failures. When a failure is recognized, the algorithm determines the optimal strategy for redistributing energy within the energy storage system to minimize likelihood of propagation of thermally-induced failures.

A unique set of response actions is provided which depend on failure location, system SoCs, temperatures, converter power constraints, thermal connectivity and thermal resistances between cells/sub-assemblies, and other parameters which characterize the system's electrical and thermal structure.

The algorithm includes a model for the time-scale characteristics for the propagation of thermal runaway and transfer of thermal energy including the effects of the state of charge on the rate of propagation through the system. This understanding will take the form of a thermal network model with direct and indirect paths for heat transfer, together with an understanding of the potential heat transferred from thermal runaway events, and with an understanding of the state of a cell/module that leads to thermal runaway (of a subsequent layer). The thermal network model incorporates potential thermal sources and sinks including other flammable (chemical sources) and inert materials involved in the system construction and operation. The system incorporates an understanding of thermal conditions for which electrochemical and other chemical sources will release energy as heat.

Alternative exemplary embodiments relate to other features and combinations of features as may be generally recited in the claims.

Other features and advantages will be made apparent from the present specification. The teachings disclosed extend to those embodiments that fall within the scope of the claims, regardless of whether they accomplish one or more of the aforementioned needs

BRIEF DESCRIPTION OF THE DRAWINGS

The application will become more fully understood from the following detailed description, taken in conjunction with the accompanying figures, wherein like reference numerals refer to like elements, in which.

DETAILED DESCRIPTION OF THE INVENTION

Before turning to the figures which illustrate the exemplary embodiments in detail, it should be understood that the application is not limited to the details or methodology set forth in the following description or illustrated in the figures. It should also be understood that the phraseology and terminology employed herein is for the purpose of description only and should not be regarded as limiting.

Figure 1:
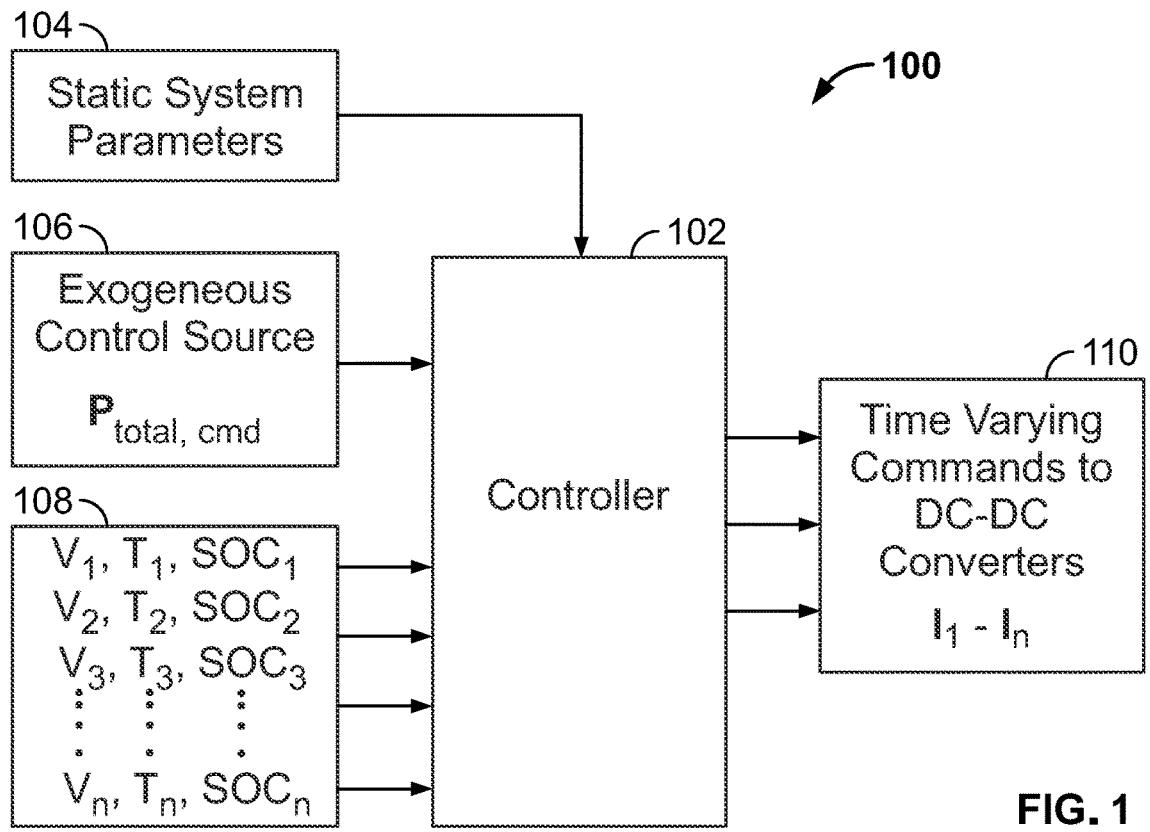
FIG. 1 shows a stored energy dispersion control system of the present invention.

Referring to FIG. 1, a stored energy dispersion control system 100 is shown schematically. A controller 102 receives input values from various components of the system 100. Static parameters 104, which characterize among other things, the battery cells, configuration of multi-cell sub-assemblies, power converter operating constraints, electrical interconnections, and thermal structure, are provided to controller 102. Specific static parameters may include, but are not limited to, system power rating, power converter power ratings, cell/sub-assembly capacity, temperature ranges for safe operation, cell and sub-assembly geometry, and any other descriptors which may enable or limit the system's energy redistribution actions in response to a fault.

Time-varying parameters 106 are generated by exogenous control sources. Potential control sources vary by end-use application. For example, in a storage system engaged in grid frequency regulation, the relevant control input is an automatic generator control signal issued by the local utility operator. This signal is communicated as a per-unit active power command (represented as $P_{total,\,cmd}$ in FIG. 1). Exogenous control signals for other applications could include reactive power commands, inverter output voltage commands, and any other system-level operational parameters.

Time-varying parameters 108 are dynamic and generated to the controller from measured sensor values, calculations based upon sensor measurements, or by communications with related battery equipment, such as conventional battery management system devices. For example, parameters associated with the $n^{th}$ battery sub-assemblies may include internal sub-assembly voltages $V_n$, measured temperatures $T_n$ within sub-assembly n, and overall sub-assembly state of charge $SOC_n$.

Command values 110 generated by controller 102 are communicated to power converters to control the exchange of energy between individual battery sub-assemblies and the rest of the energy storage system. These commands include, for instance, charging and discharging currents applied to battery sub-assemblies.

Figure 2:
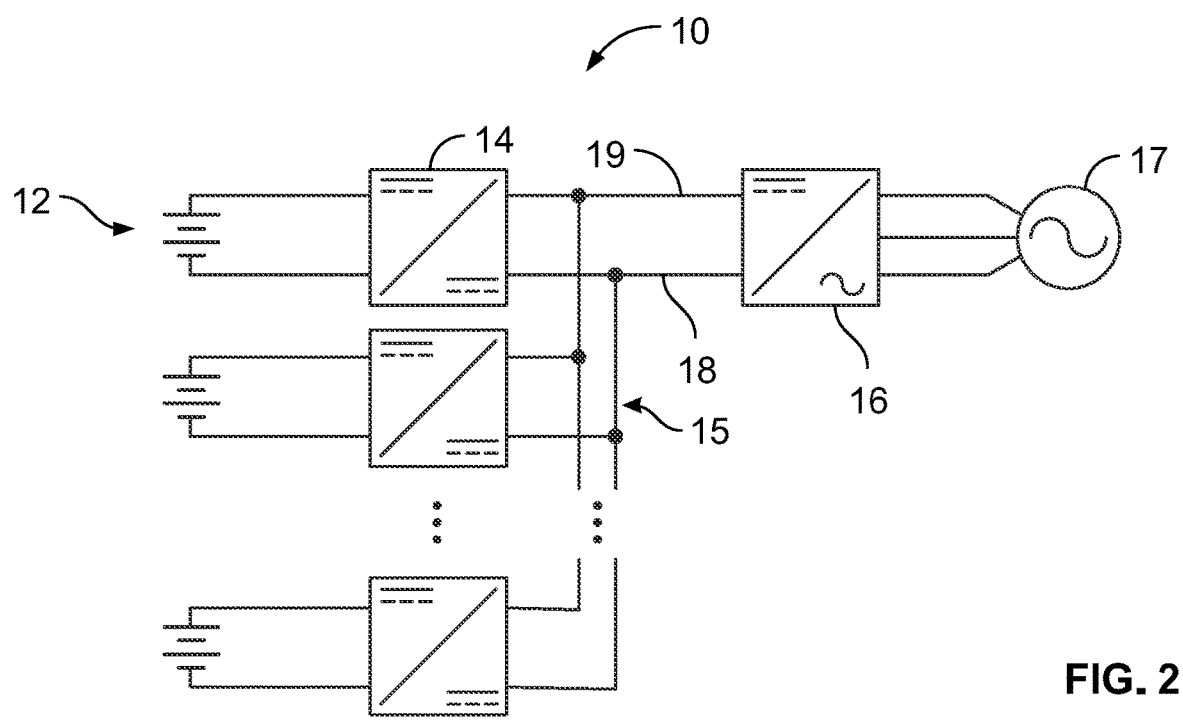
FIG. 2 shows an exemplary system architecture for the control system of FIG. 1.

Referring next to FIG. 2, an exemplary system architecture 10 of the present invention is shown. Battery sub-assemblies 12 are connected in parallel to provide DC power to DC-DC converters 14. Sub-assemblies 12 include one or more battery cells, ranging in scale from an individual cell to a module containing many interconnected cells in nested series/parallel combinations. Each sub-assembly is paired with a DC-DC converter which exerts control over how the sub-assembly exchanges power with the rest of the system. DC-DC converters in the exemplary system architecture in FIG. 2, as well as the alternative exemplary system architectures in FIG. 3 and FIG. 4, have two ports. One port connects to a battery sub-assembly and the other connects to a shared bus through which the converters exchange power to redistribute energy. It should be understood that DC-DC converters in energy storage systems as described herein are bidirectional. The converters may arbitrarily control current or voltage at either port. Thus, the terms input and output are relative.

In the exemplary architecture shown in FIG. 2, each DC-DC converter 14 is connected to a DC bus 15 consisting of positive conductor 19 and negative conductor 18. The shared DC bus 15 connects to the DC link of an inverter 16. Inverter 16 converts the DC power from the DC link to AC power to serve a local AC load or grid connection 17. In the exemplary architecture shown in FIG. 2, the DC bus formed by conductors 19 and 18 acts as the shared bus through which energy may be exchanged between battery sub-assemblies 12 to accomplish energy redistribution. In an alternate embodiment multiple inverters 16 may be connected in parallel between the DC bus conductors 19 and 18 and one or more AC loads 17. The inverter 16 may be replaced by a DC-DC converter to support DC loads or storage applications in DC power systems. Further, the shared DC bus may optionally include a point of connection to external systems or loads, through which energy may be extracted during the energy redistribution process.

Referring again to FIG. 1, controller 102 generates commands 110 to each individual DC-DC converter 14 which have the effect of charging or discharging each associated sub-assembly 12. During normal operating conditions, i.e., when there is no system fault, control commands ensure beneficial load sharing between sub-assemblies 12 (see FIG. 2) to distribute system-level charge and discharge current equally, thus preventing excessive strain on any individual sub-assembly. During a fault, charging and discharging current is controlled by controller 102 to execute an energy dispersion algorithm (see, e.g., FIG. 8).

Referring again to FIG. 2, sub-assemblies 12 need not be configured identically in system 10. Since each sub-assembly 12 may be managed by its dedicated DC-DC converter 14, sub-assemblies 12 may differ in composition. For example, a hybrid storage system may be constructed with both battery-sourced energy storage and supercapacitors. Alternatively, a "second-life" storage system may be constructed with repurposed battery sub-assemblies which, due to age and previous use, differ in energy capacity, internal resistance, and other operational parameters. Different sub-assembly combinations enable and require different energy dispersion responses, so characteristics of each sub-assembly 12 may be incorporated into controller 102 (FIG. 1) as a static system parameter 104.

Figure 3:
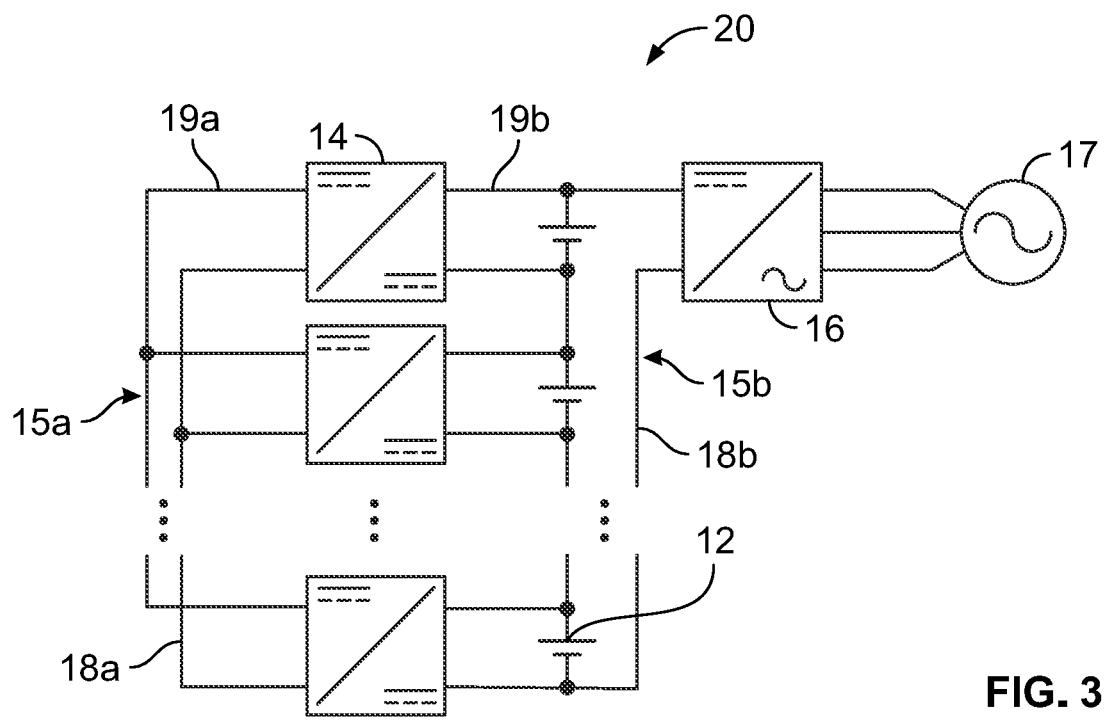
FIG. 3 shows an alternative exemplary system architecture to FIG. 2 employing an auxiliary shared bus configuration with series-connected battery sub-assemblies.
Figure 4:
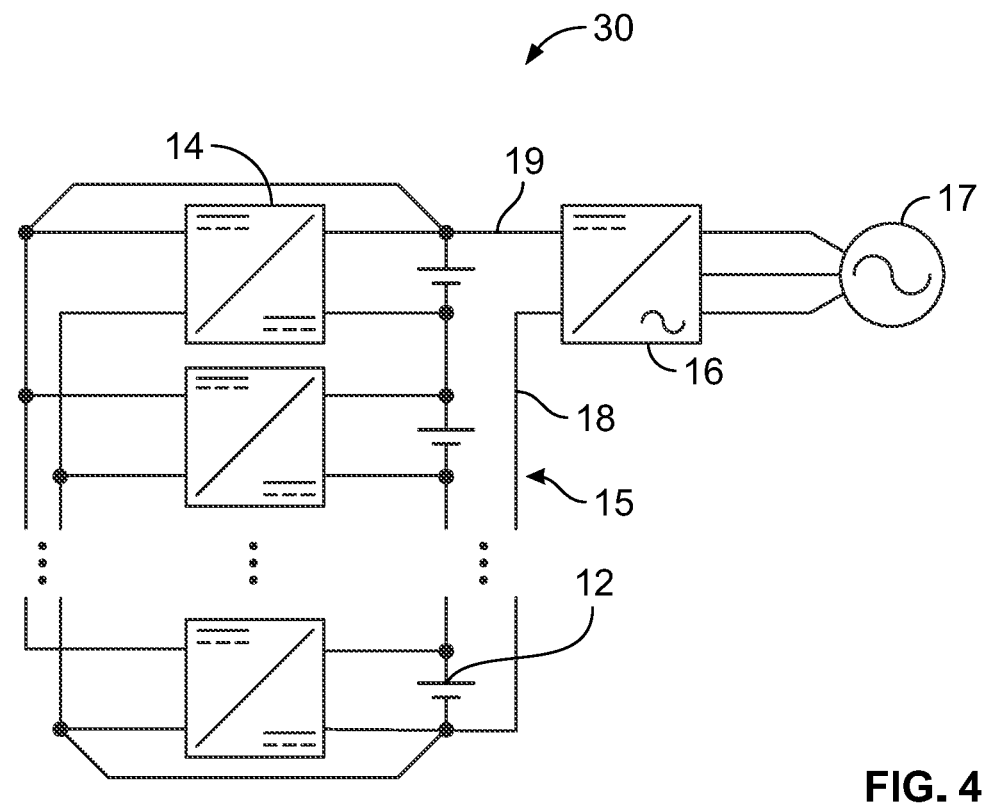
FIG. 4 shows an alternative exemplary system architecture to FIG. 2 employing a main shared bus configuration with series-connected battery sub-assemblies.

FIGS. 3 and 4 show variations on the basis premise described above with respect to FIG. 2 that include multiple battery sub-assemblies interfaced to a shared DC bus through which power is exchanged. In the configurations shown in FIGS. 3 and 4, series-connected battery sub-assemblies connect directly to the DC-link of an inverter. The primary advantage of connecting battery sub-assemblies directly to the inverter DC link is efficiency. In the configuration shown in FIG. 2, all power exchanged between a battery sub-assembly and grid connection 17 passes through two power conversion stages: the inverter 16 and DC-DC converter 14. Both power conversion stages incur some loss. In contrast, the configurations in FIGS. 3 and 4 involve only one conversion stage (the inverter) between battery sub-assemblies and the grid connection. The configurations in FIGS. 3 and 4 differ in how the shared bus is implemented.

FIG. 3 shows an exemplary configuration 20 in which the shared bus 15a formed by conductors 19a and 18a is electrically isolated from the DC-link 15b formed by conductors 19b and 18b. The operable voltage range of an inverter DC link is constrained by several factors, including the maximum rated voltage of the inverter's semiconductor devices and the AC load or grid connection to which the inverter is connected. Separating the shared bus 15a and DC link 15b allows the nominal voltage of the shared bus to be set irrespective of DC link voltage constraints. This provides more flexibility for the design and operation of DC-DC converters 14, which may be leveraged to reduce costs and improve efficiency.

FIG. 4 shows an exemplary configuration 30 in which the shared 15 bus is directly connected to the inverter DC link. The shared bus 15 is subject to the DC link's voltage range constraints in this configuration. However, there are operational advantages to maintaining a direct connection between the shared bus and DC link. If a battery sub-assembly is removed from this configuration, the series-connected battery stack will no longer form a complete circuit at the DC link. However, the DC-DC converters will still be capable of delivering power to DC link, since the DC link and shared bus are directly connected. This capability allows the system to continue operating without all of its sub-assemblies, reducing system downtime during sub-assembly maintenance and replacement.

Note that the differences between configurations in FIGS. 2, 3, and 4 affect performance in nominal operation, i.e., when the system is not responding to a fault event. The specific advantages of each configuration cater to the needs of different end-use applications. The configuration in FIG. 2 is best able to handle sub-assemblies with differing compositions, providing flexibility in storage device sourcing.

The configuration in FIG. 3 has increased efficiency and can be designed with lower cost DC-DC converters. The configuration in FIG. 4 has the ability to continue operating with only a subset of its sub-assemblies and is suited to mission critical applications wherein uninterruptible operation is required.

Figure 6:
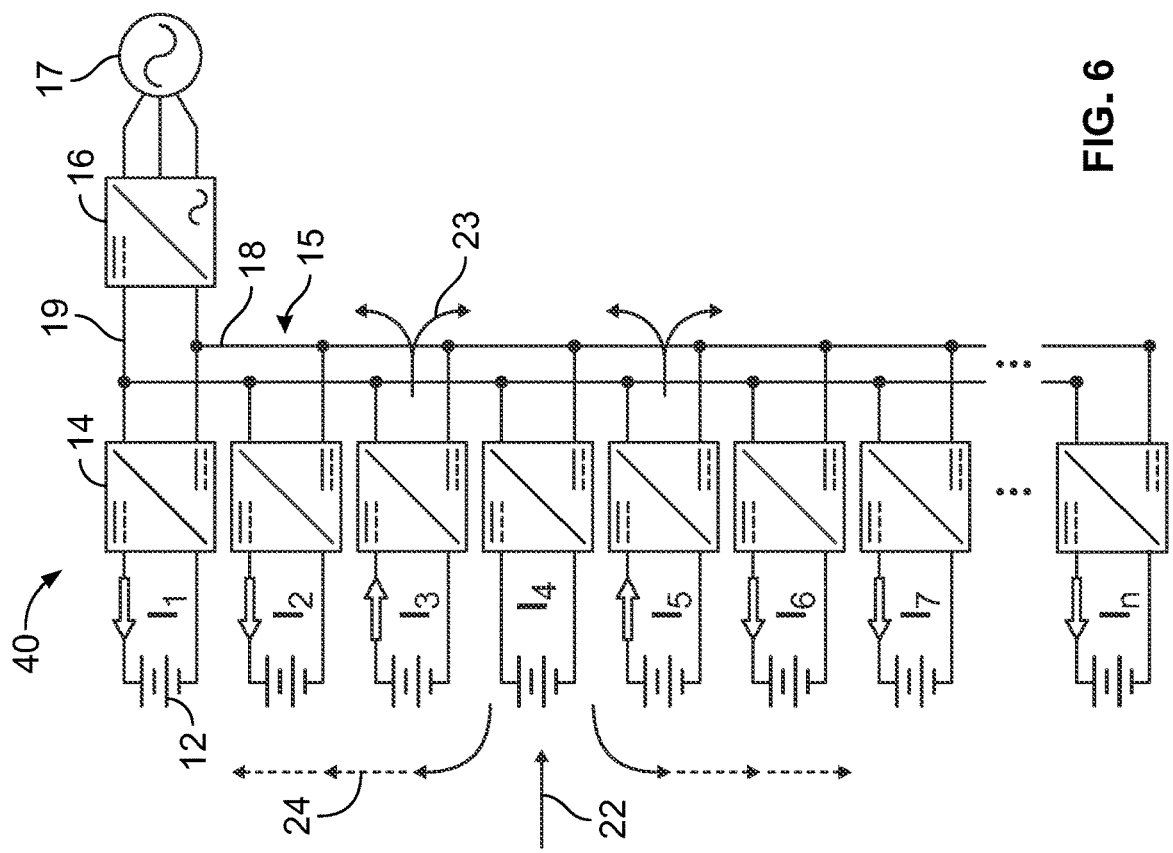
FIG. 6 shows the dispersion system initial response to detecting a fault condition in the converter system shown in FIG. 5.
Figure 5:
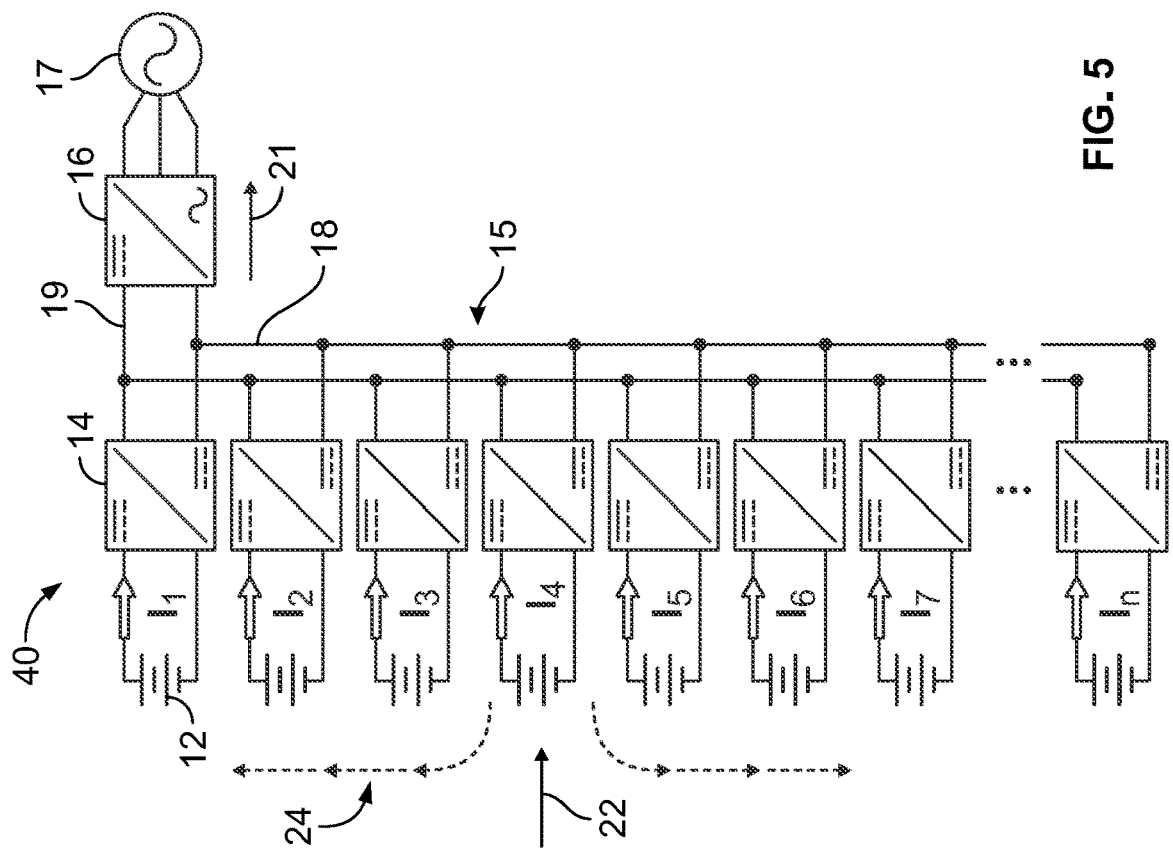
FIG. 5 shows a multiple converter system having n converters.
Figure 7:
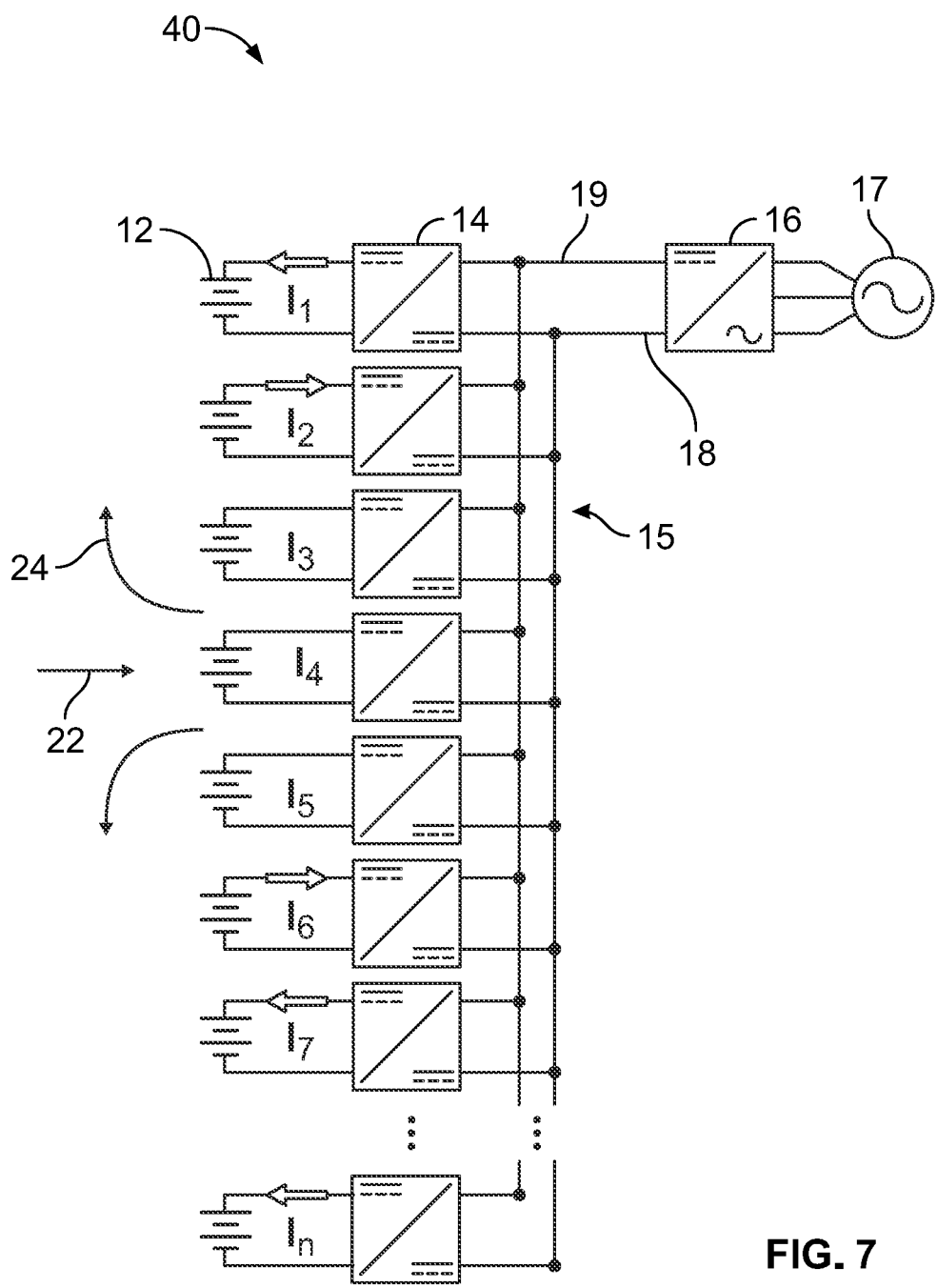
FIG. 7 shows the dispersion system progression to the next adjacent layer of sub-assemblies from the fault condition.

Referring next to FIGS. 5 through 7, an exemplary fault situation is described. The figures show a multiple converter system 40 having n converters and battery sub-assemblies. Each DC-DC converter 14 and battery sub-assembly 12 are associated with a charging or discharging current. Converter and sub-assembly 1 are associated with current $I_1$, converter and sub-assembly 2 are associated with $I_2$, and so forth. In normal operation prior to the occurrence of a fault, controller 102 (FIG. 1) receives power commands from an exogenous source and divides the system-level power output 21 into charging/discharging currents $I_1$ through $I_n$ for each respective battery sub-assembly 12. Power commands to controller 102 may be generated, e.g., by an operator, a site controller for the storage installation, an automatic generator control signal from a local utility, or any other high-level control source.

FIGS. 5 through 7 show the same exemplary system as it proceeds through a fault scenario. FIG. 5 shows the system immediately upon detection of a fault at sub-assembly 4, indicated by arrow 22. The fault is detected by sensors in sub-assembly 4. In this example, the fault is detected by observing a rapid increase in the temperature within the sub-assembly. Upon fault detection, inverter 16 disconnects from AC load 17, e.g., the grid, electrically isolating the system. Sub-assembly 4 begins to enter a thermal runaway condition. Arrows 24 indicate the eventual transfer of thermal energy to adjacent sub-assemblies if the fault event is left unaddressed. That dashed lines of arrows 24 indicate that this energy transfer is not yet occurring at the time shown in FIG. 5, but will occur if no action is taken. In other words, the dashed lines indicate the pathway thermal energy will take in the exemplary system. As this transfer begins, temperatures of the sub-assemblies 3 and 5, which are the nearest sub-assemblies to the fault location 22, begin to rise. The temperatures rise with a time lag dependent on the thermal resistivity and heat capacity of the involved components.

In response to detecting the fault condition 22, controller 102 initiates a control algorithm (FIG. 8) to electrically transfer energy away from the location of the fault and inhibit the propagation of thermal runaway. This is accomplished by calculating charge/discharge commands to be sent to the DC-DC converters 14. The currents resulting from these commands are shown as $I_1$ through $I_n$ in FIGS. 5. through 7. The calculation of charge/discharge commands is driven by static parameters 104 and time-varying parameters 108. The static parameters 104 characterize the electrical, thermal, and mechanical structure of the system. These parameters include, e.g., the geometric arrangement of sub-assemblies, nominal sub-assembly capacity, and DC-DC converter power/current limits described above. Time-varying parameters 108 describe the dynamically changing state of the system and include variables such as sub-assembly temperatures and states of charge, or SOC.

Referring next to FIG. 6, the control algorithm beings the energy redistribution by issuing current commands. Priority 1 in the controller's response is reacting to the most imminent threat of propagation. As indicated in FIG. 6, thermal transfer from the fault location 22 begins to affect adjacent sub-assemblies 3 and 5. Arrows 24 indicate the thermal energy transfer. Solid lines indicate transfer in progress and, as in FIG. 5, dotted lines indicate eventual transfer if unaddressed. If the thermal time lag described above provides sufficient time, the algorithm will determine that the optimal course of action is to deplete the stored energy in sub-assemblies adjacent to the thermal runaway event. In the scenario shown in FIG. 6, the algorithm determines that the optimal course of action is to deplete sub-assemblies 3 and 5, and issues charge/discharge commands to DC-DC converters 14. Note the direction of currents $I_1$, $I_2$, and $I_6$-$I_n$, indicating a change in polarity from discharging to charging. Sub-assemblies with charging currents receive the energy discharged from sub-assemblies 3 and 5. The resulting direction of electrical energy flow is indicated by arrows 23. If the thermal time lag described above is insufficient, the next adjacent set of sub-assemblies (sub-assemblies 2 and 6) will be depleted instead. The thermal time lag is largely dependent on the fixed system physical configuration, but also depends on dynamic quantities including present temperatures and heat generation associated with electrical energy transfer (e.g., power conversion losses, Ohmic losses). The time required to transfer energy will depend on the present SOC and the system's ability to safely transit that stored energy to other sub-assemblies.

Referring next to FIG. 7, sub-assemblies 3 and 5, which were at greatest risk of being pushed into thermal runaway, have now been sufficiently depleted of energy to inhibit the propagation of the thermal runaway event through the system. The respective DC-DC converters 14 for sub-assemblies 3 and 5 are deactivated, effectively isolating these sub-assemblies from the system 40. Decreasing the SOC of sub-assemblies 3 and 5 delays or arrests the propagation of thermal runaway from the original fault event 22. At this stage, the likelihood of propagation can be further reduced by depleting the next sub-assemblies adjacent to the failure. Controller 102 proceeds to continue dispersing energy away from the failure event at sub-assembly 4. This process continues until the remaining energy in the system is as far, measured according to the flow path of thermal energy, as possible.

Figure 8:
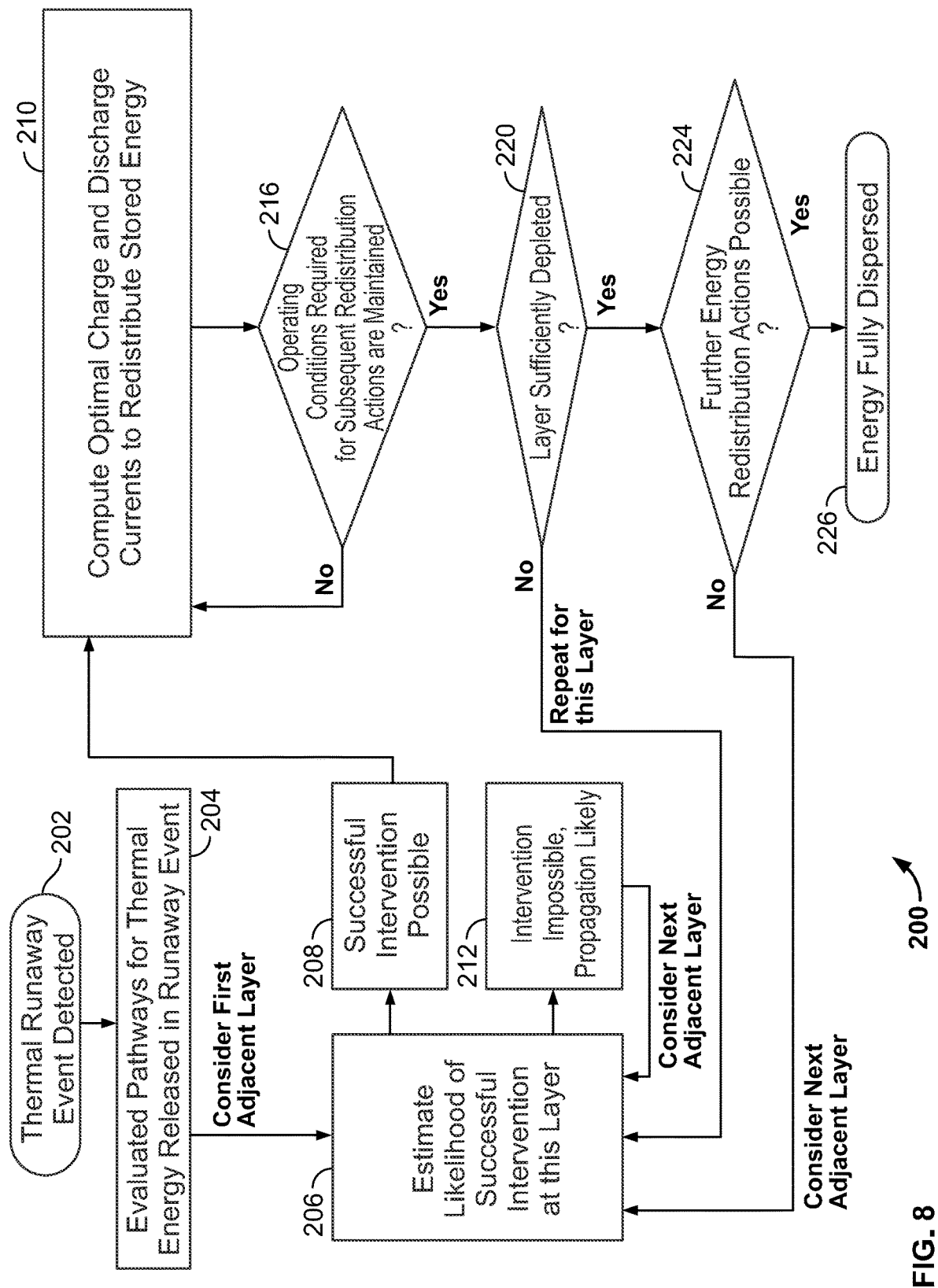
FIG. 8 shows an exemplary control algorithm of the dispersion system.

Referring next to FIG. 8. an exemplary control algorithm 200 of the present invention is shown. At step 202, the algorithm is initiated by detection of a thermal runaway event, such as may be caused by a fault. The algorithm proceeds to step 204 to mark the failed sub-assembly 12 as inactive and disable the inverter 16 to isolate the system 40. Next, at step 206, the first adjacent layer of sub-assemblies is evaluated, and a likelihood of successful intervention is determined. The term "layer" is defined by proximity to the sub-assembly experiencing thermal runaway: sub-assemblies in a layer are approximately equal in distance from the pathways taken by thermal energy released in the thermal runaway event. Each layer increments outward like a shell around the failed sub-assembly.

If, according to the estimation in step 206, successful intervention is determined to be possible at step 208, the algorithm proceeds to step 210 to compute a discharge current value that is optimal for the static and dynamic characteristics associated with the respective layer. Otherwise, if it is determined after step 206 that propagation of thermal runaway is likely and intervention is not possible, step 212 returns the algorithm to step 206 and evaluates the next adjacent layer. This assessment of likelihood that thermal runaway will propagate to adjacent sub-assemblies is driven by the relative thermal time lag and extent of SOC depletion possible given electrical constraints of the sub-assemblies, converters, and interconnections. Step 212 is repeated until a point of intervention with high likelihood of facilitating successful inhibition of thermal runaway propagation is found. The redistribution is enacted through optimal charge/discharge current commands generated at step 210. Step 210 includes a determination of which sub-assemblies will be charged. This determination may be based on sub-assembly location and availability of an external connection for extraction of energy from the system. If a sub-assembly will not receive any dispersed energy, its charging current is zero.

The algorithm 200 then proceeds to determine in step 216 if operational parameters necessary to facilitate energy dispersion (e.g., voltage stability of the shared DC bus) are being adequately maintained; if not maintained, the algorithm repeats step 210. This determination may be accomplished as a check on whether the voltage at the shared DC bus has deviated from its nominal value, which would indicate an imbalance of current injected and extracted from the bus and, if unchecked, lead to loss of ability to redistribute energy. The determination in step 216 may also a check on whether converters are within suitable thermal limits. As thermal energy is released in the system, converter temperatures will rise. Continued operation beyond maximum temperature ratings presents a risk of converter failure, which would prevent the sub-assembly interfaced by that converter from participating in energy redistribution. If thermal limits are violated, then algorithm 200 would return to step 210 to recalculate charge actions which will not lead to loss of converter functionality. Thermal limits applied in step 216 may be subject to relaxation based on the severity of the thermal event: faced with the risk of total system loss to cascading thermal failures, the algorithm would accept higher risk of converter failure. If step 216 determines that parameters necessary for continued energy exchange are adequately maintained, the algorithm 200 proceeds to step 220 to assess whether sufficient energy redistribution actions have been taken. In the exemplary embodiment of FIG. 8, step 220 determines if the present layer of sub-assemblies has been sufficiently depleted. Sufficiently depleted means that further discharge will have negligible effect on the likelihood of thermal runaway propagating through the sub-assembly. The algorithm repeats the loop containing steps 206, 208, 210, and 216 until a sufficient level of depletion is achieved in step 220.

Next the algorithm 200 determines in step 224 if all possible actions which could reduce the likelihood that thermal runaway will be able to propagate in the system have been fully exhausted. This condition could be reached, e.g., if all remaining sub-assemblies are fully charged. If additional actions remain, then algorithm 200 identifies the next adjacent layer and returns to step 206 until no further redistribution is possible. The end state 226 of the algorithm is obtained when energy cannot be dispersed further from the location of the initial thermal runaway event along the system's thermal pathways. For embodiments which include an external port for energy redistribution to external loads or storage systems, the algorithm would continue until all stored energy has been extracted.

While the exemplary embodiments illustrated in the figures and described herein are presently preferred, it should be understood that these embodiments are offered by way of example only. Accordingly, the present application is not limited to a particular embodiment but extends to various modifications that nevertheless fall within the scope of the appended claims. The order or sequence of any processes or method steps may be varied or re-sequenced according to alternative embodiments.

The present application contemplates methods, systems and program products on any machine-readable media for accomplishing its operations. The embodiments of the present application may be implemented using an existing computer processor, or by a special purpose computer processor for an appropriate system, incorporated for this or another purpose or by a hardwired system.

It is important to note that the construction and arrangement of the energy dispersion system and method as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the exemplary embodiments without departing from the scope of the present application.

As noted above, embodiments within the scope of the present application include program products comprising machine-readable, non-transitory media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

It should be noted that although the figures herein may show a specific order of method steps, it is understood that the order of these steps may differ from what is depicted. Also, two or more steps may be performed concurrently or with partial concurrence. Such variation will depend on the software and hardware systems chosen and on designer choice. It is understood that all such variations are within the scope of the application. Likewise, software implementations could be accomplished with standard programming techniques with rule based logic and other logic to accomplish the various connection steps, processing steps, comparison steps and decision steps.

The invention claimed is:

1. A method for dispersion of stored energy within a battery system comprising:
    providing an energy storage system comprising a plurality of battery sub-assemblies connected through DC-DC converters to a shared DC bus;
    detecting a thermal runaway event associated with one of the battery sub-assemblies;
    isolating the sub-assembly associated with the thermal runaway event;
    identifying pathways taken by a thermal energy released by the thermal runaway event;
    determining a likelihood of successfully mitigating propagation of thermally-induced failures proximate to the inactivated sub-assembly based on system structure and current conditions;
    computing an optimal set of discharge current values to most effectively disperse stored energy from the thermal energy pathway;
    determining which sub-assemblies of the plurality of sub-assemblies may receive dispersed energy for charging;
    determining a respective optimal charging current value for each sub-assembly of the plurality of sub-assemblies and generating a command to dispersed energy at the optimal charging current value respectively;
    determining whether one or more of the sub-assemblies has been sufficiently depleted to mitigate the propagation of thermal runaway; and
    isolating one or more sub-assemblies which have been sufficiently depleted until no further dispersion of energy is possible in the system.

2. The method of claim 1, wherein in response to determining that successfully mitigating propagation of thermally-induced failures is not possible, returning to the step of determining a likelihood of successfully mitigating propagation in a next adjacent layer from the first adjacent layer; and
    iteratively repeating the determining of thermal propagation in successive respective adjacent layers of sub-assemblies until a successful intervention is determined to be possible.

3. The method of claim 2, further comprising: computing an optimal charging current for a static and dynamic characteristic associated with the respective adjacent layer of sub-assemblies.

4. The method of claim 3, wherein: in response to determining that a sub-assembly will not receive any dispersed energy, setting the charging current value to zero.

5. The method of claim 1, further comprising determining whether a shared bus voltage is maintained, and if determined that the common bus voltage is not maintained, repeating the step of computing an optimal charging current.

6. The method of claim 1, wherein the step of determining if an adjacent layer of sub-assemblies is sufficiently depleted comprises determining that further discharge of the respective sub-assembly will be negligible to decreasing the likelihood of thermal runaway propagating therethrough.

7. The method of claim 6, further comprising repeating until the present layer is sufficiently depleted.

8. The method of claim 7, further comprising ending the dispersion of energy in response to determining that all sub-assemblies are fully charged and energy cannot be dispersed further from the location of the initial thermal runaway event.

9. The method of claim 1, further comprising identifying and applying variable thermal limits to power converters to manage acceptance of converter failure risk according to the severity of the thermal runaway event.

* * * * *